(No Model.)
E. L. GILES.
MEANS FOR ATTACHING TASSELS, PULLS, &c., TO CORDS.
No. 301,492. Patented July 8, 1884.
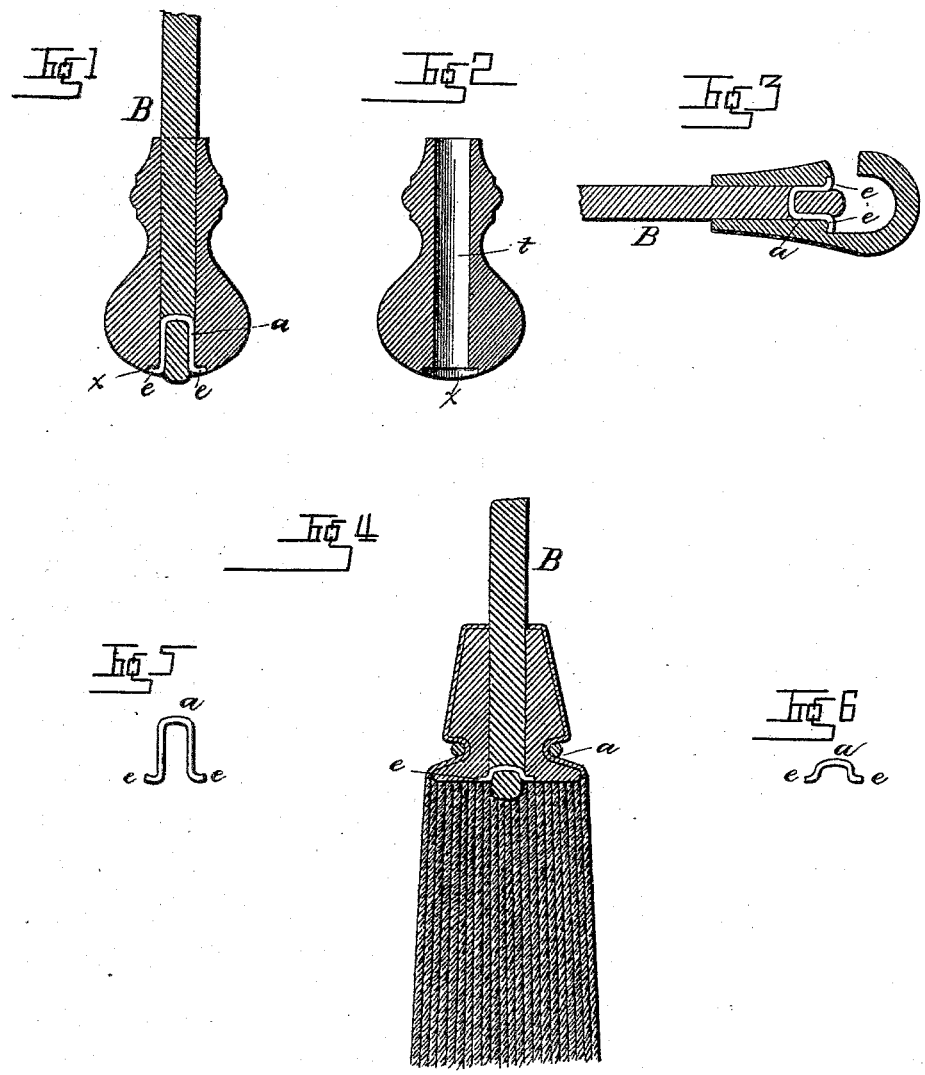

UNITED STATES PATENT OFFICE.

EDWIN L. GILES, OF LOWELL, MASSACHUSETTS.

MEANS FOR ATTACHING TASSELS, PULLS, &c., TO CORDS.

SPECIFICATION forming part of Letters Patent No. 301,492, dated July 8, 1884.

Application filed December 4, 1883. (No model.)

*To all whom it may concern:*

Be it known that I, EDWIN L. GILES, of the city of Lowell, in the county of Middlesex and State of Massachusetts, have invented certain new and useful Improvements in Cord Attachments, of which the following is a specification.

My invention consists in a means of connecting tassels, pulls, or other attachment to cords, whereby the connection of the two is facilitated and strengthened and rendered more stable than those usually employed. The connection in some of its different forms and connections is illustrated in the drawings, in which—

Figure 1 is a sectional view of a cord and pull and connecting device. Fig. 2 is a section of the pull detached. Fig. 3 is a sectional view, showing the attachment applied for securing the catch-hook of a railway-signal cord. Fig. 4 illustrates the device as applied to connecting a cord to a tassel, and Figs. 5 and 6 illustrate different forms of connecting device.

It is common, in securing pulls, tassels, &c., to cords, to pass the latter through openings in the former, and then knot the cord to prevent it from pulling through. The knot is not only objectionable because it is sometimes in the way of other connections, as in the case of a railway-signal cord, but works against the bearing and rapidly wears, so that the attachment soon becomes disconnected from the cord. Transverse pins have also been driven through the pulls, or through holes drilled in the attachment; but this connection is objectionable because of the frequent splitting of wood, when the latter is used, or the difficulty in removing the rivet. I obviate these objections by means of a connecting device consisting of a transverse wire, $a$, adapted to be passed through the cord, and bent to form shoulders and ears $e$, whereby the same is held in position in the cord and the bearing secured at some point upon the pull, hook, or other attachment. In making the connection the wire is passed transversely through the cord B, at some distance from its end, either before or after the cord is introduced into the opening in the pull, and the cord is then drawn through said opening until the ears $e$ strike the end of the pull or enter notches $x$, formed therein for their reception. When the cord is strong and compact, the ears may be nearly on a line with the body of the connection, as shown in Fig. 6, and the same may be arranged near the end of the cord, as shown in Fig. 4; but when the cord is loose and the strands will separate readily, the connection should be more in the form of a yoke, as shown in Fig. 5, and should be passed through the cord at a greater distance from the end, as shown in Fig. 1.

The wire of which the connection is made may be round or flat and of any suitable size and material.

I claim—

1. An attachment for connecting cords to tassels, pulls, and other like articles, consisting of a wire bent to form a body portion, $a$, and lateral ears $e$, and intermediate shoulders, substantially as set forth.

2. The combination of a tassel, pull, or other like attachment, a cord extending through an opening in said attachment, and a connecting device consisting of a wire extending transversely through the cord and bent to form lateral ears having their bearing upon the attachment, substantially as specified.

In testimony whereof I have signed my name to this specification in the presence of two subscribing witnesses.

EDWIN L. GILES.

Witnesses:
ASA G. CHARLES,
EUGENE F. ENDICOTT.